3 Sheets—Sheet 1.

C. H. WILLIAMS,

Assignor to CLEVELAND CITY FORGE AND IRON CO.

MACHINE FOR MAKING COUPLING PINS.

No. 9,828. Reissued Aug. 2, 1881.

Witnesses.
J. H. Lapham
J. H. Burridge.

Inventor.
C. H. Williams
W. H. Burridge, Atty.

N. PETERS. Photo-Lithographer, Washington, D. C.

3 Sheets—Sheet 2.

C. H. WILLIAMS,

Assignor to CLEVELAND CITY FORGE AND IRON CO.

MACHINE FOR MAKING COUPLING PINS.

No. 9,828. Reissued Aug. 2, 1881.

Witnesses.

J. H. Lapham

J. H. Burridge

Inventor.

C. H. Williams

W. H. Burridge
Atty.

N. PETERS, Photo-Lithographer, Washington, D. C.

C. H. WILLIAMS,

Assignor to CLEVELAND CITY FORGE AND IRON CO.

MACHINE FOR MAKING COUPLING PINS.

No. 9,828. Reissued Aug. 2, 1881.

Witnesses.

J. H. Lapham

J. H. Burridge

Inventor.

C. H. Williams

W. H. Burridge Atty.

N. PETERS, Photo-Lithographer, Washington, D. C.

UNITED STATES PATENT OFFICE.

CHARLES H. WILLIAMS, OF CLEVELAND, OHIO, ASSIGNOR TO CLEVELAND CITY FORGE AND IRON COMPANY, OF SAME PLACE.

MACHINE FOR MAKING COUPLING-PINS.

SPECIFICATION forming part of Reissued Letters Patent No. 9,828, dated August 2, 1881.

Original No. 110,179, dated December 13, 1870. Application for reissue filed May 2, 1881.

*To all whom it may concern:*

Be it known that I, CHARLES H. WILLIAMS, of Cleveland, in the county of Cuyahoga and State of Ohio, have invented certain new and useful Improvements in Mechanism for Making Coupling-Pins; and I do hereby declare that the following is a full, clear, and complete description thereof.

Figure 1:
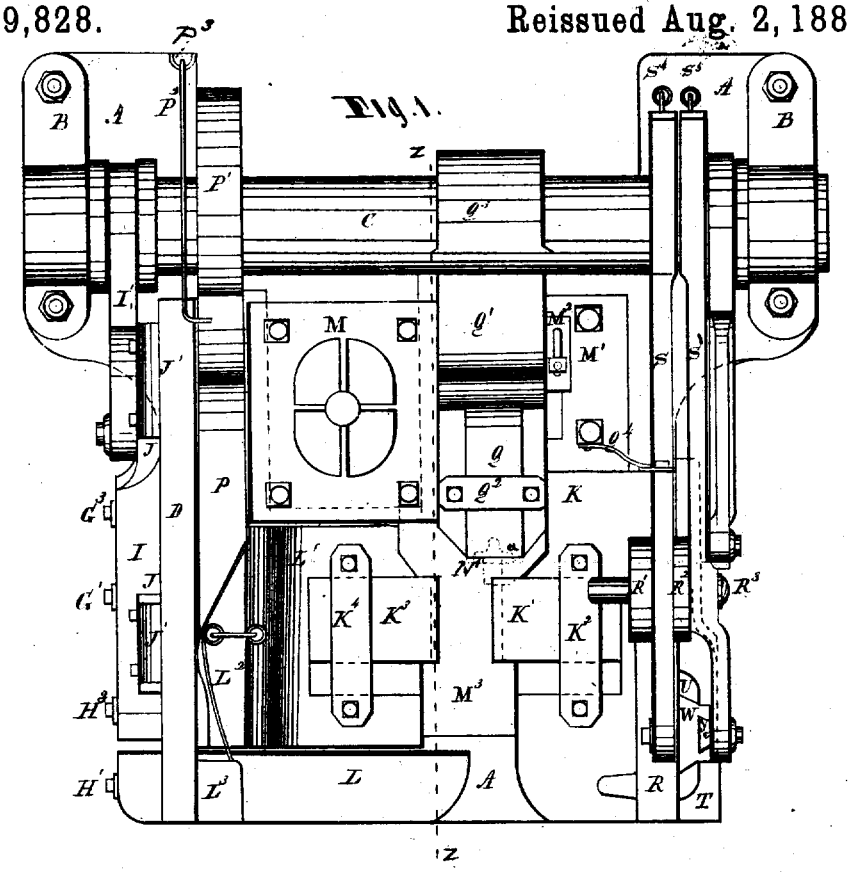
Figure 2:
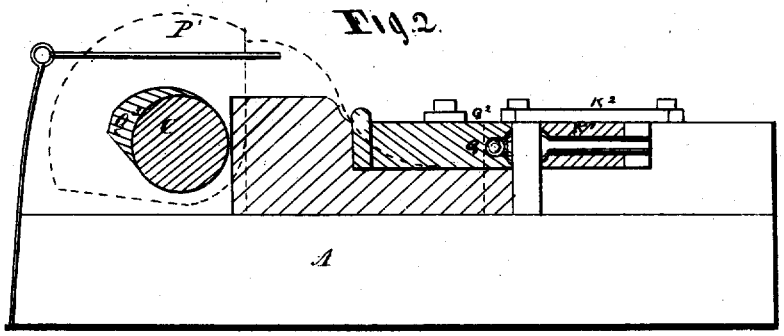
Figure 5:
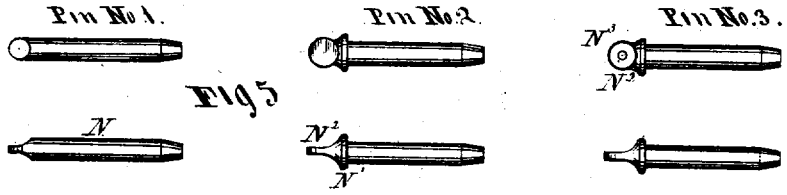
Figure 3:
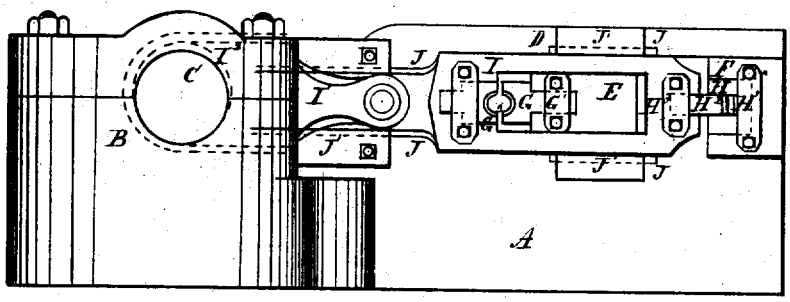
Figure 4:
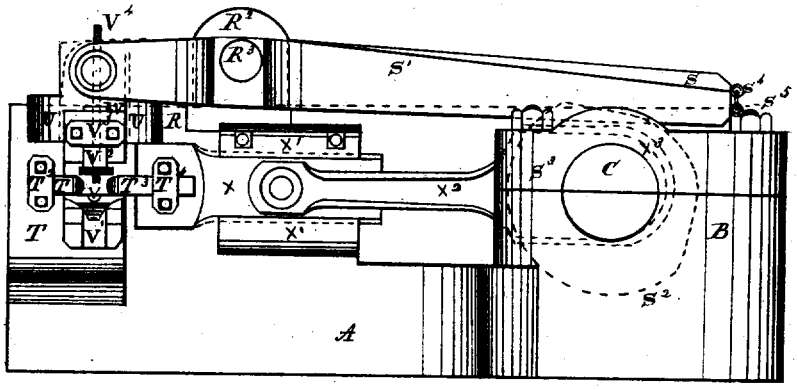

Figure 1 is a plan or top view of a machine with my improvements for making coupling-pins for railroad-cars. Fig. 2 is a section to the right of the line *z z*, Fig. 1. Fig. 3 is the left-hand side of the machine. Fig. 4 is the right-hand side. Fig. 5 shows a coupling-pin in successive stages of its manufacture. On Plate 3 are additional detached figures of the several dies used in the machine for making coupling-pins, which figures are enlarged views and will be referred to in description.

In the drawings, A is an iron bed-plate or table, which may be of the form shown, or such other as will answer the purpose, and provided with journal-boxes B B for the shaft C, which may be provided with a pulley or gear to turn it and operate the machine.

Figure 6:
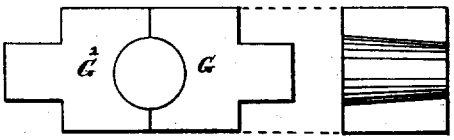
Figure 7:
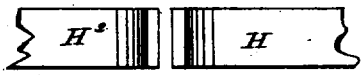
Figure 8:
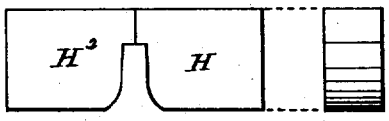
Figure 9:
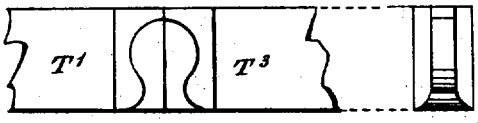

On the left-hand side of the plate A, I make the flange D, and on the left side of the flange the lugs E and F, for seats for the dies G H, Figs. 3, 6, and 7, which are fastened by plates G′ H′ in place, as shown in Fig. 3.

The traversing yoke I is fitted to traverse on the lug E, and provided with flanges J J, arranged to traverse under the cleats J′ J′ when it is worked by the link I′, which connects it to the cam $I^2$ on the shaft C. This yoke has the die $G^2$ fastened to it by the plate $G^3$, which die corresponds to the die G, Fig. 6, to taper and form the points of the pins, as shown in Fig. 5.

The die $H^2$, Figs. 3 to 7, is fastened in the end of the yoke I by the plate $H^3$, Fig. 3, which die $H^2$ is a counterpart of the die H, to swage the handle or top of the pins flat, as shown in Fig. 5.

On the top of the plate A the lug K is made to form a seat for the die K′, which is fastened by the plate $K^2$, secured by bolts, as seen in Fig. 1. At the lower left-hand corner of the plate A the lug L is made with a groove under its upper edge, for the flange on the traversing block L′ to traverse in. This block has a flange on the opposite edge, which traverses under the edge of the guide-block M, which is fastened to the plate A by bolts, as shown in Fig. 1.

Figure 12:
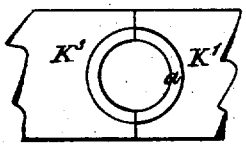
Figure 13:
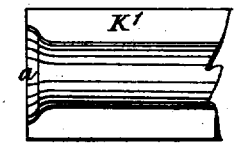
Figure 14:
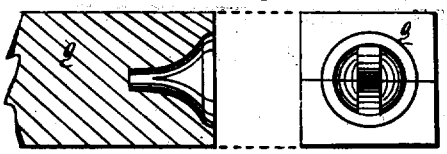

The block L′ carries the die $K^3$, which is fastened to it by the plate $K^4$, Fig. 1, and corresponds to the die K′, Figs. 1, 12, 13. The die $K^3$, Fig. 1, corresponds to $K^3$, Figs. 12 13, which dies are grooved to clamp the shaft N of the pin and hold it while a portion of it is upset to form the head or collar N′, one-half of this collar being formed in the countersink in the dies, as shown by dotted lines in Fig. 1, at *a*.

The traversing slide P, which works against the inside of the flange D, is held in position by a flange traversing under the edge of the block M. This slide P has its forward or lower end inclined, to correspond to an incline on the block L′, so that when the slide P is pushed down by the cam P′ on the shaft C the block L′ and the die $K^3$ are moved toward the die K′ to clamp and hold the shaft of the pin, as before stated.

The heading or upsetting die Q is fastened in its stock Q′ by the plate $Q^2$, Fig. 1. This stock is fitted to traverse on the plate A, and has a flange on each side, one of which works under the edge of the block M and the other under the edge of the guide-block M′, fastened to the plate A, and it is pushed forward to carry the die Q down to the dies K′ $K^3$ by the cam $Q^3$ on the shaft C, and is forced back by the spring $Q^4$ against a lug on the side of the stock Q′.

The slide P is drawn back by the rod $P^2$ and spring $P^3$, fastened to the plate A, and the block L′ is drawn back by the spring $L^2$, fastened to the lug $L^3$, as shown in the drawings.

When the slide Q′ is thrown back by the spring $Q^4$ it is stopped by the adjusting-slide $M^2$, fastened to the block M′. By adjusting this slide M′ the slide and die may be stopped, so as to graduate the quantity of iron put in the collar N′. After the collar N′ has been formed on the pin the dies open and the pin drops down through the opening $M^3$ in the plate A to the right side for further manipulation.

The devices for swaging the neck or handle and punching it are shown in Fig. 1 and in elevation in Fig. 4. To this end the flange R and lugs R′ $R^2$ are made to project up from the right-hand sides of the lug K, and the lugs R′ $R^2$ are perforated for the pin $R^3$, which forms the fulcrums of the levers S S′, which are raised by the cams $S^2$ $S^3$ on the shaft C. (Shown by dotted lines in Fig. 4.) These levers are drawn down or against the cams and kept in contact therewith by the spiral springs $S^4$ $S^5$, attached to the bed-plate.

On the right-hand side of the machine the lug T is made to form seats for the die T′, which is held in place by the plate $T^2$, and also for the die V, which is held in place by the guide-rest V′.

Figure 10:
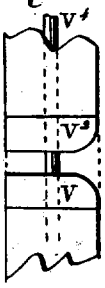
Figure 11:
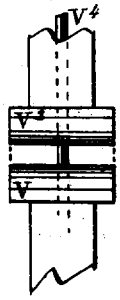

The traverse-slide or die-box W is fitted to traverse between the lugs U U on the side of the flange R, and is worked by the lever S, fitted into a stud in the back of the slide W, Figs. 1, 4. This slide W forms the seat for the die $V^2$, which is fastened to it by the plate $V^3$. The dies V and $V^2$ are clamping-dies, (seen in Figs. 4, 10, 11,) which press the handle $N^2$ of the pin and keep it flat, while the dies T′ $T^3$ swage or compress and narrow the neck of the handle, as shown in No. 3, Fig. 5, and remain closed around the handle while the punch $V^4$ descends and punches the hole in handle and finishes the pin. The die $T^3$ has its seat in the traversing slide X, and is fastened to it by the plate $T^4$. This slide traverses between the ways X′ X′, and is worked by the link $X^2$, which connects it to the cam $X^3$ on the shaft C. (Shown by dotted lines in Fig. 4.) The slide W has a recess or groove in its upper end, in which the block Y is fitted to traverse, and is worked by the lever S′ on a stud in the side of the block.

The dies V and $V^2$ are perforated for the punch $V^4$, which is fastened in the block Y, and worked by it so as to punch a hole in the handle $N^2$ after it is necked and while it is clamped by the dies V $V^2$.

Figure 15:
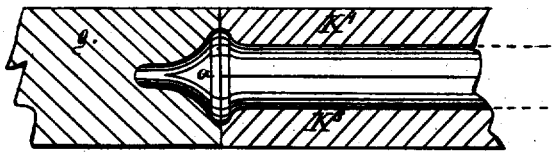

To make the coupling or shackle pins, I take a bar of iron of the proper size and length, and heat one end thereof and put it between the dies G $G^2$, Fig. 3, to swage the point, and after the dies have closed once upon it and opened the bar is to be turned one-fourth the way around and the dies allowed to close on it again, which completes the point. The other end is then heated and put in between the dies $H^2$ H to flatten the end for the handle, and while it is still hot the flat end or handle is put between the dies K′ $K^3$, into the socket in the die Q, Figs. 1, 12, 13, 14, 15. The said socket is formed to fit the flattened end, to thus preserve its shape, while the dies K′ $K^3$ clamp the bar, and the die Q moves down onto the clamping-dies and upsets the bar, or that portion of it that is between the ends of the clamping-dies and the die Q, and forms the head or collar N′ in the countersinks *a*, Figs. 13, 15, and indicated by dotted lines *a* in Fig. 1. When the collar is formed the die Q is drawn back from off the head and handle, and the clamping-dies open and the pin falls to the ground, as set forth. It is taken up, and while the head is still hot the handle is put in between the dies V $V^2$, Figs. 4, 10, 11, which clamp and hold it flat while the dies T′ and $T^3$ swage and narrow the neck of the handle, and the punch $V^4$ descends and punches the hole $N^3$ in the handle and finishes the pin.

What I claim as my invention, and desire to secure by Letters Patent, is—

1. The above-described machine for making coupling-pins for railway-cars, provided with the dies H′ and $H^2$ for flattening the handle, and the dies Q, K′, and $K^3$ for forming the head or collar, and the dies V and $V^2$, and the dies T′ and $T^3$ and the punch $V^4$ for necking the handle and punching the hole in it, substantially as described.

2. The combination of the dies H and $H^2$, co-operating for flattening the handle of the pin in the manner substantially as set forth.

3. In combination with the dies K′ and $K^3$, provided with a countersink, *a*, the heading-die Q, also provided with an annular countersink corresponding to *a* of the dies K′ and $K^3$, and co-operating therewith for forming the collar of the pin, substantially as described.

4. In machines for the manufacture of car-coupling pins, the perforated clamping-dies V and $V^2$ and compressing-dies T′ $T^3$ and punch, operating conjointly for forming the neck or handle of the pin and punching the same, substantially as set forth.

5. In combination with the block L′, carrying the die $K^3$, the slide P, cam-spring $P^3$, link and spring $L^2$, and link connecting said spring to the die-carrying block L′, substantially as described, and for the purpose specified.

6. In combination with the stock Q′, carrying the heading-die Q, the cam $Q^3$, and spring $Q^4$, for the purpose substantially as set forth.

7. With the clamping-dies V and $V^2$ and punch $V^4$, the combination of the levers S and S′, pivoted to the studs R′ and $R^2$, with their respective cams and springs, arranged substantially as and for the purpose set forth.

8. As an improvement in the art of making car-coupling pins, forging a bar of metal by means of dies adapted thereto and applied successively, so as to upset a portion of the bar near one end into a cavity of proper shape, and thus form upon it a solid collar, to flatten the extremity of the pin adjacent to form the head or handle, to reduce the metal lying between the collar and the head to form the neck, and to taper the opposite end of the pin to facilitate its entrance into the hole, and to hold in coupling when applied, substantially as set forth.

In evidence whereof I subscribe my name in presence of two witnesses.

CHARLES H. WILLIAMS.

Witnesses:
J. H. BURRIDGE,
A. L. CHAMPION.